United States Patent
Makino et al.

(10) Patent No.: US 7,821,610 B2
(45) Date of Patent: Oct. 26, 2010

(54) LIQUID CRYSTAL DISPLAY DEVICE AND ALIGNMENT PROCESS METHOD

(75) Inventors: Tetsuya Makino, Kakogawa (JP); Shinji Tadaki, Kawasaki (JP); Toshiaki Yoshihara, Kawasaki (JP); Hironori Shiroto, Kobe (JP); Yoshinori Kiyota, Kawasaki (JP); Shigeo Kasahara, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 11/976,074

(22) Filed: Oct. 19, 2007

(65) Prior Publication Data

US 2008/0042961 A1 Feb. 21, 2008

Related U.S. Application Data

(63) Continuation of application No. PCT/JP2005/007452, filed on Apr. 19, 2005.

(51) Int. Cl.
*G02F 1/1345* (2006.01)

(52) U.S. Cl. .................. 349/149; 349/151; 349/187; 349/106

(58) Field of Classification Search ......... 349/149–152, 349/123, 106, 187, 96; 345/97
See application file for complete search history.

(56) References Cited

U.S. PATENT DOCUMENTS

| | | | |
|---|---|---|---|
| 5,617,229 A * | 4/1997 | Yamamoto et al. | 349/42 |
| 5,719,752 A | 2/1998 | Mori et al. | |
| 5,920,300 A * | 7/1999 | Yamazaki et al. | 345/94 |
| 6,100,957 A | 8/2000 | Kawada et al. | |
| 6,888,610 B2 | 5/2005 | Yoshihara et al. | |
| 6,903,717 B2 | 6/2005 | Takahashi et al. | |
| 2003/0197670 A1 | 10/2003 | Mori et al. | |
| 2004/0095303 A1 | 5/2004 | Moon et al. | |
| 2005/0052381 A1 | 3/2005 | Lee | |
| 2005/0212737 A1 | 9/2005 | Yoshihara et al. | |
| 2007/0013637 A1 | 1/2007 | Moon et al. | |

FOREIGN PATENT DOCUMENTS

JP        2-287318       11/1990

(Continued)

OTHER PUBLICATIONS

European Search Report mailed Apr. 20, 2009 and issued in corresponding European Patent Application 05734393.1.

(Continued)

*Primary Examiner*—Thoi V Duong
(74) *Attorney, Agent, or Firm*—Staas & Halsey LLP (57) ABSTRACT

Although portions of electrodes in proximity to a driver IC are covered with an insulating film, part of the electrodes is not covered with the insulating film. Thus, this insulating film absent region functions as an external voltage supply region that receives, from the outside, application of a voltage which is different from an output voltage from a driving unit. When the alignment of the initial state is disarranged, an alignment process is performed by short-circuiting all electrodes of the driving unit and applying a voltage from the outside, through the external voltage supply region, whereby the alignment is restored to the initial state with the driving unit being mounted on a liquid crystal panel.

12 Claims, 10 Drawing Sheets

FOREIGN PATENT DOCUMENTS

| | | |
|---|---|---|
| JP | 4-106522 | 4/1992 |
| JP | 6-265906 | 9/1994 |
| JP | 9-50004 | 2/1997 |
| JP | 2681528 | 8/1997 |
| JP | 3403114 | 2/2003 |
| JP | 2003-108021 | 4/2003 |
| JP | 2003-195314 | 7/2003 |
| JP | 2004-310026 | 11/2004 |
| KR | 2003-69810 | 8/2003 |
| KR | 2005-96805 | 10/2005 |
| WO | 91/10223 | 7/1991 |
| WO | 97/32235 | 9/1997 |

OTHER PUBLICATIONS

English language version of the International Search Report (PCT/ISA/210) of the International Application PCT/JP2005/007452 (mailed on Aug. 9, 2005).

Korean Office Action mailed Apr. 30, 2009 in corresponding Korean Patent Application 10-2007-7026364.

Korean Office Action mailed Apr. 30, 2009 in corresponding Korean Patent Application 10-2007-7026364.

Japanese Office Action mailed Aug. 3, 2010 in the related Japanese Patent Application No. 2007-514378.

* cited by examiner

LIQUID CRYSTAL DISPLAY DEVICE AND ALIGNMENT PROCESS METHOD

This application is a continuing application, filed under 35 U.S.C. §11(a), of International Application PCT/JP2005/007452, filed Apr. 19, 2005, the entire contents of which are incorporated herein by reference.

TECHNICAL FIELD

The present invention relates to a liquid crystal display device and an alignment process method. More particularly, the present invention relates to a liquid crystal display device having a region that receives application of a voltage from the outside, and an alignment process method of performing an alignment process for a liquid crystal material by a voltage application using the region.

BACKGROUND ART

A widespread used TN (Twisted Nematic) liquid crystal has a response speed of ten to several tens of milliseconds with respect to an applied voltage. The response speed suddenly becomes slow in halftone display having a different number of gradation levels and may reach a value close to one hundred milliseconds. Hence, when moving image display (60 images/second) is performed on a liquid crystal display device using a TN liquid crystal, an image is blurred because liquid crystal molecules cannot fully operate, and thus, the TN liquid crystal is not suitable for use to perform multimedia moving image display.

In view of this, a liquid crystal display device using a ferroelectric liquid crystal or antiferroelectric liquid crystal which has spontaneous polarization and a response speed of as fast as several tens to several hundreds of microseconds with respect to an applied voltage, has been put to practical use. When such a liquid crystal which enables a fast response is used, a voltage to be applied to each pixel is controlled by a switching element such as a TFT (Thin Film Transistor) or an MIM (Metal Insulator Metal) and polarization of liquid crystal molecules is completed in a short period of time, whereby excellent moving image display is made possible. A liquid crystal display device is proposed that drives an active drive type liquid crystal panel having switching elements such as TFTs or MIMs provided thereto and having a ferroelectric liquid crystal or antiferroelectric liquid crystal filled therein (see Patent Documents 1 and 2, for example).

[Patent Document 1] Japanese Patent No. 2681528
[Patent Document 2] Japanese Patent No. 3403114

DISCLOSURE OF THE INVENTION

Problems to be Solved by the Invention

In such a liquid crystal display device, a liquid crystal panel is fabricated by allowing a glass substrate having a switching element and a pixel electrode formed thereon for each pixel to face a glass substrate having a flat-shaped counter electrode formed thereon, filling a liquid crystal material into a space between the substrates, and performing an alignment process on the liquid crystal material. Then, driving units are mounted on the fabricated liquid crystal panel by thermocompression bonding. Upon mounting the driving units on the liquid crystal panel or upon assembling a liquid crystal display module, heat of the thermocompression bonding may be applied to the liquid crystal panel or pressure may be applied to an active display area; accordingly, the alignment of the initial state of the liquid crystal material may be disarranged.

When a ferroelectric liquid crystal or antiferroelectric liquid crystal is used as a liquid crystal material, once the alignment of the initial state is disarranged, the alignment does not return to its original state. Thus, a process by which the alignment of the initial state can be obtained needs to be performed again. To bring the alignment of the entire liquid crystal panel to its initial state, it is preferable that commonality be provided for all extraction electrodes on the source side and commonality be provided for all extraction electrodes on the gate side and then a voltage be applied. However, in a liquid crystal panel after being subjected to a thermocompression bonding process, since driving units are already mounted, there is a problem that it is difficult to perform an alignment process and to perform an alignment process the driving units need to be dismounted.

The present invention is made in view of such circumstances. An object of the present invention is therefore to provide a liquid crystal display device in which, when the alignment of the initial state is disarranged, an alignment process can be performed with driving units being mounted, and an alignment process method.

Means for Solving the Problems

A liquid crystal display device according to one aspect of the present invention includes: a liquid crystal panel having a liquid crystal material filled between substrates which face each other; a driving unit that drives the liquid crystal panel to control application of a voltage to the liquid crystal material, for each of a plurality of pixels; and wiring lines connecting the liquid crystal panel and the driving unit, wherein a region for applying, from outside, a voltage other than an output voltage from the driving unit is provided to the wiring lines.

A liquid crystal display device according to another aspect of the present invention includes: a liquid crystal panel having a liquid crystal material filled between substrates which face each other; and a driving unit that is mounted on the liquid crystal panel and drives the liquid crystal panel to control application of a voltage to the liquid crystal material, for each of a plurality of pixels, wherein a region for applying, from outside, a voltage other than an output voltage from the driving unit is provided to the liquid crystal panel.

A liquid crystal display device according to still another aspect of the present invention may be such that the driving unit is mounted on one side of the liquid crystal panel having a rectangular shape, and the region is provided on the side of the liquid crystal panel where the driving unit is mounted.

A liquid crystal display device according to still another aspect of the present invention may be such that the driving unit is mounted on one side of the liquid crystal panel having a rectangular shape, and the region is provided on other side of the side of the liquid crystal panel where the driving unit is mounted.

A liquid crystal display device according to still another aspect of the present invention may be such that the liquid crystal material is a liquid crystal material having spontaneous polarization.

A liquid crystal display device according to still another aspect of the present invention may be such that color display is performed using a color filter method.

A liquid crystal display device according to still another aspect of the present invention may be such that color display is performed using a field sequential method.

An alignment process method according to still another aspect of the present invention is a method of performing, on a liquid crystal display device including: a liquid crystal panel having a liquid crystal material filled between substrates which face each other; a driving unit that drives the liquid crystal panel to control application of a voltage to the liquid crystal material, for each of a plurality of pixels; and wiring lines connecting the liquid crystal panel and the driving unit, an alignment process for the liquid crystal material by applying a voltage to the liquid crystal panel, the method including: performing an alignment process by applying a voltage to a region which is provided to the wiring lines and to which a voltage other than an output voltage from the driving unit is applied from outside.

An alignment process method according to still another aspect of the present invention is a method of performing, on a liquid crystal display device including: a liquid crystal panel having a liquid crystal material filled between substrates which face each other; and a driving unit that is mounted on the liquid crystal panel and drives the liquid crystal panel to control application of a voltage to the liquid crystal material, for each of a plurality of pixels, an alignment process for the liquid crystal material by applying a voltage to the liquid crystal panel, the method including: performing an alignment process by applying a voltage to a region which is provided to the liquid crystal panel and to which a voltage other than an output voltage from the driving unit is applied from outside.

According to the present invention, a region that receives application of a voltage from the outside is provided to wiring lines in a driving unit connected to a liquid crystal panel. Thus, a voltage other than an output voltage from the driving unit can be applied to the liquid crystal panel from the outside. For example, when the alignment of the initial state of a liquid crystal material is disarranged after the driving unit is mounted on the liquid crystal panel, by performing an alignment process by applying a voltage to the region, an alignment process can be easily performed without dismounting the driving unit.

According to the present invention, a region that receives application of a voltage from the outside is provided on the side of a liquid crystal panel where a driving unit is mounted. Thus, a voltage other than an output voltage from the driving unit can be applied to the liquid crystal panel from the outside. For example, when the alignment of the initial state of a liquid crystal material is disarranged after the driving unit is mounted on the liquid crystal panel, by performing an alignment process by applying a voltage to the region, an alignment process can be easily performed without dismounting the driving unit.

According to the present invention, a region that receives application of a voltage from the outside is provided on the other side of the side of a liquid crystal panel where a driving unit is mounted. Thus, a voltage other than an output voltage from the driving unit can be applied to the liquid crystal panel from the outside. For example, when the alignment of the initial state of a liquid crystal material is disarranged after the driving unit is mounted on the liquid crystal panel, by performing an alignment process by applying a voltage to the region, an alignment process can be easily performed without dismounting the driving unit.

According to the present invention, a material having spontaneous polarization is used as a liquid crystal material. By using a liquid crystal material having spontaneous polarization, a fast response is enabled. Thus, high moving image display characteristics can be implemented and display using a field sequential method can also be easily implemented.

The present invention can be applied to any of a liquid crystal display device using a color filter method that performs color display using a white light source and color filters, and a liquid crystal display device using a field sequential method that can perform, using a color light source, color display with high resolution, high color purity, and fast response.

EFFECTS OF THE INVENTION

In the present invention, a region is provided that enables application of a voltage other than an output voltage from a driving unit, to a liquid crystal panel from the outside. Thus, for example, even when the alignment of the initial state is disarranged upon mounting a driving unit or upon assembling a module, by performing an alignment process by applying a voltage to the region, the alignment can be easily restored to its initial state with the driving unit being mounted. In addition, evaluation can be made such that the characteristics of the liquid crystal panel itself are distinguished from the characteristics of the driving unit. For example, when a display failure occurs, it is possible to determine which one of the liquid crystal panel and the driving unit is the cause of the failure.

DESCRIPTION OF THE NUMERALS

1: Liquid Crystal Panel
2: Counter Electrode
3: Color Filter
4: Glass Substrate
5: Pixel Electrode
6: Glass Substrate
9: Liquid Crystal Layer
21: TFT
22: Source Driver
23: Data Line
24: Gate Driver
25: Scan Line
26: Backlight
29: Transfer Electrode
30: Voltage Line
31: LCD Control Circuit
40: Driving Unit
46, 51, 61: External Voltage Supply Region
42, 47: Electrode

BEST MODES FOR IMPLEMENTING THE INVENTION

The present invention will be described in detail with reference to the drawings showing the embodiments thereof. It is to be understood that the present invention is not limited to the following embodiments.

First Embodiment

Figure 1:
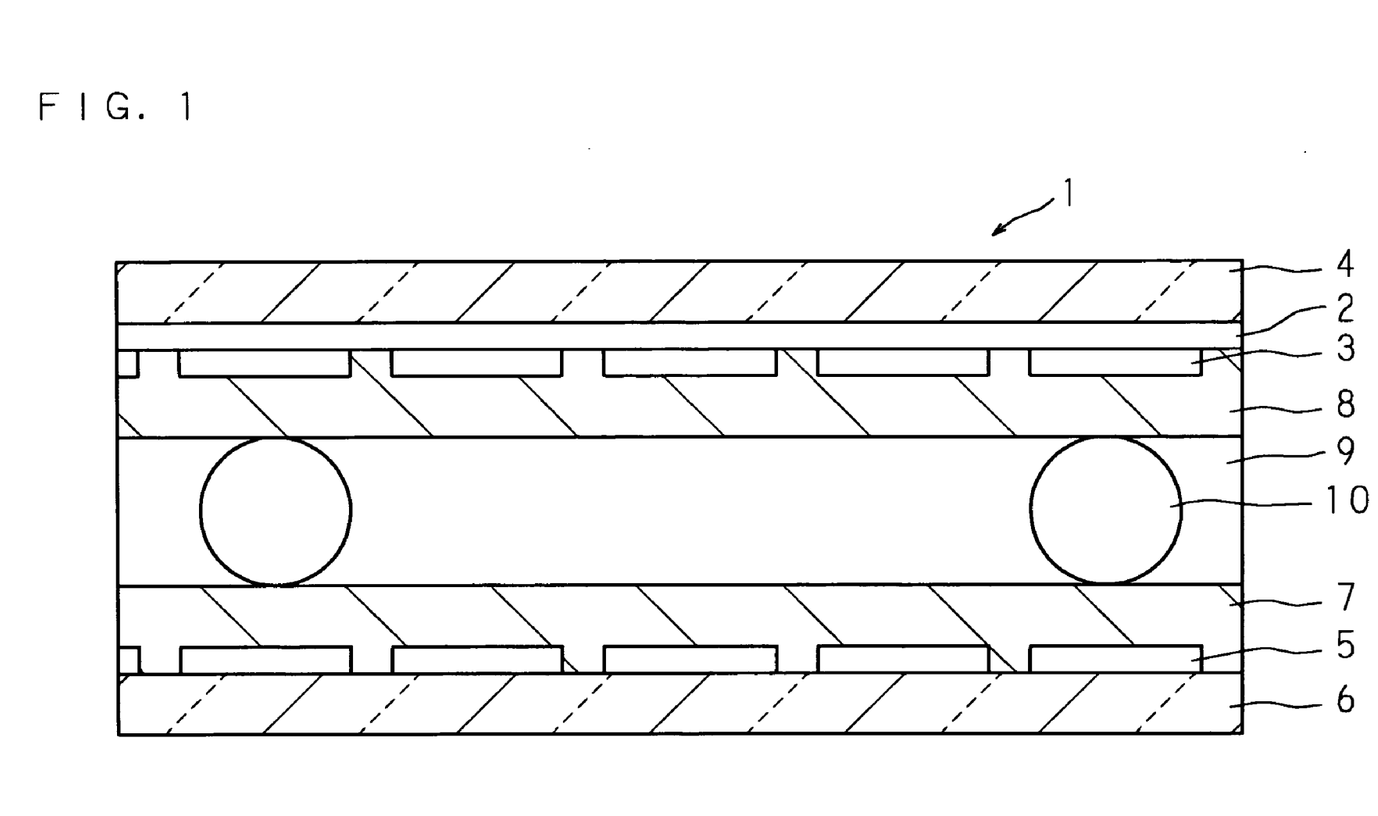
FIG. 1 is a schematic cross-sectional view of a liquid crystal panel.

FIG. 1 is a schematic cross-sectional view showing a configuration of a liquid crystal panel. As shown in FIG. 1, a liquid crystal panel 1 includes a glass substrate 6 having pixel electrodes 5 (e.g., 0.08×0.24 mm$^2$, number of pixels: 1024 H×3 RGB×768V, and 12.1-inch diagonal) composed of ITO (Indium Tin Oxide), disposed in a matrix form, and having an excellent light-transmitting property and TFTs connected to the pixel electrodes 5, respectively; and a glass substrate 4 having a counter electrode 2 and color filters 3 disposed in a matrix form.

Figure 2:
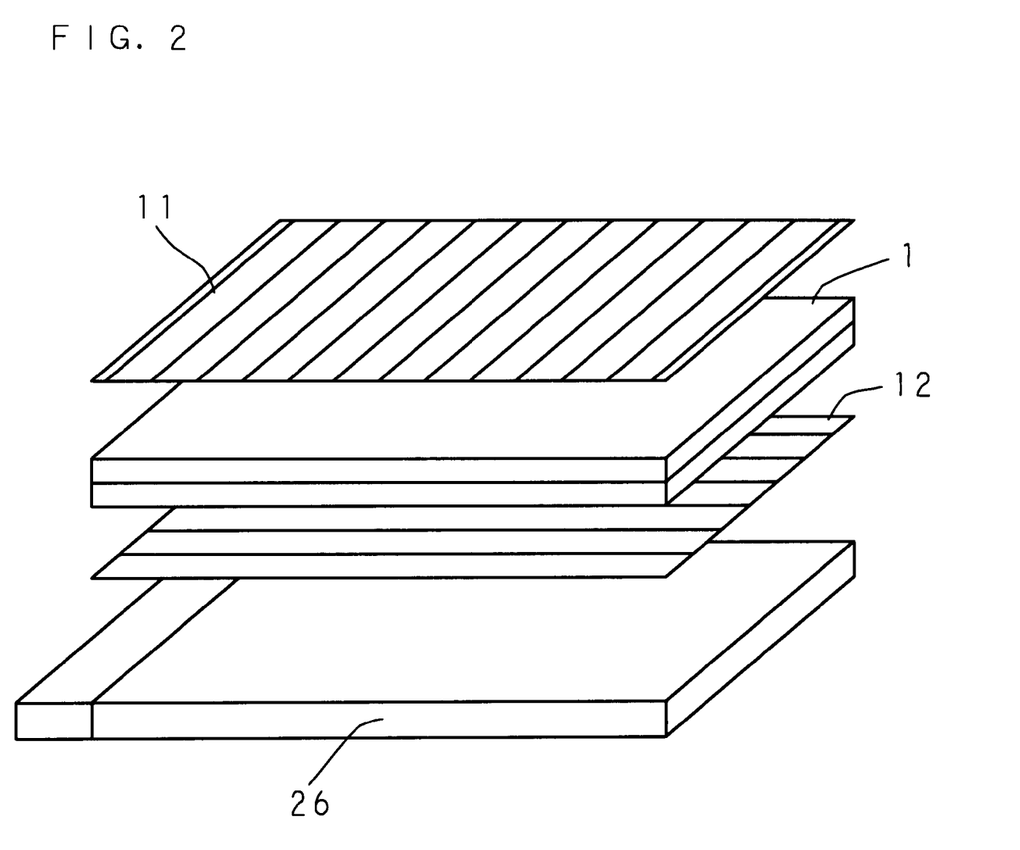
FIG. 2 is a schematic perspective view of the liquid crystal panel and a backlight.

An alignment film 7 and an alignment film 8 are provided on the pixel electrodes 5 and the color filters 3, respectively. The glass substrates 6 and 4 are disposed in such a manner that the alignment films 7 and 8 face each other. A liquid crystal layer 9 is formed by filling a ferroelectric liquid crystal into a space made by scattering, between the alignment films 7 and 8, spacers 10 (the shape is spherical, rectangular parallelepiped, columnar, a hand drum shape, an inverted hand drum shape, or the like) for maintaining a gap (e.g., 1.6 micrometers) which is uniform in a plane. As shown in FIG. 2, the liquid crystal panel 1 is sandwiched between two polarizing plates 11 and 12, and furthermore, a backlight 26 having a white light source is disposed therebelow.

Figure 3:
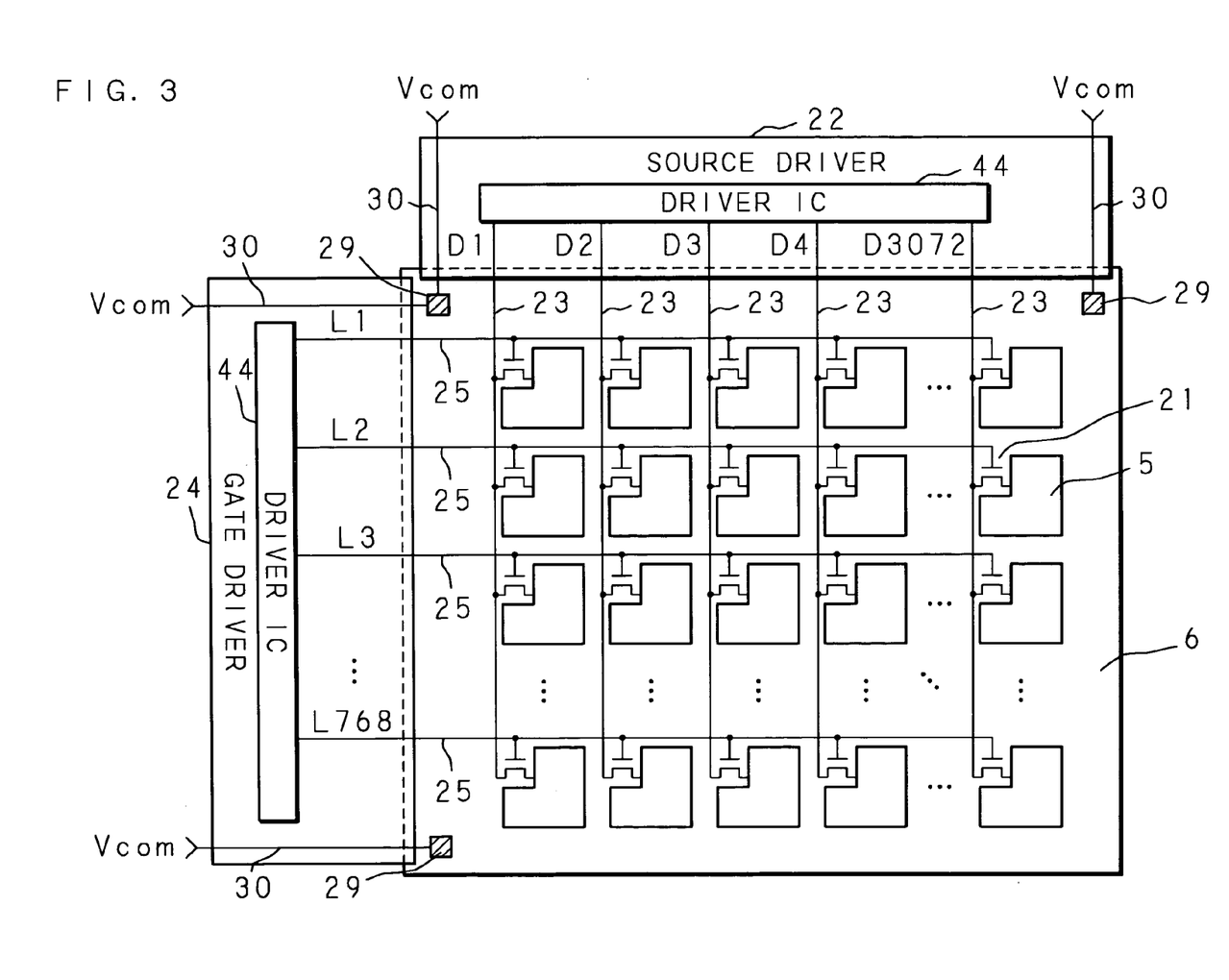
FIG. 3 is a schematic plan view of the liquid crystal panel.
Figure 4:
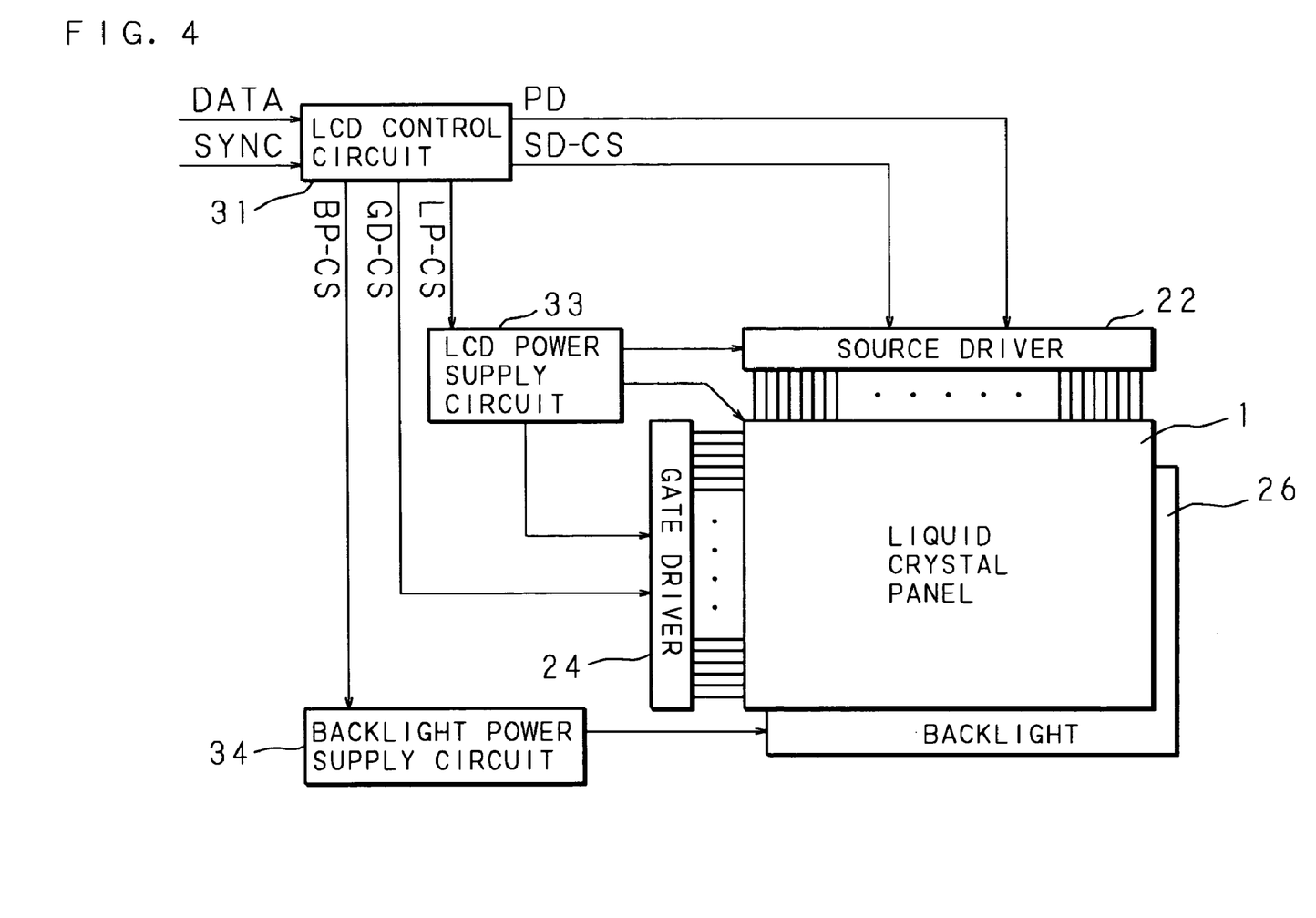
FIG. 4 is a block diagram showing the overall configuration of a liquid crystal display device.

FIG. 3 is a schematic plan view of the liquid crystal panel 1 and FIG. 4 is a block diagram showing the overall configuration of a liquid crystal display device. As shown in FIG. 3, the pixel electrodes 5 and TFTs 21 are disposed in a matrix (e.g., 1024 H×3 RGB×768V) on the glass substrate 6 and each pixel electrode 5 is connected to a drain terminal of its corresponding TFT 21. Gate terminals of the TFTs 21 are connected to scan lines 25 (Li:i=1, 2, 3, ... 768) and source terminals of the TFTs 21 are connected to data lines 23 (Dj:j=1, 2, 3, ... 3072). The scan lines 25 are sequentially connected to an output stage of a gate driver 24 serving as a driving unit that drives the liquid crystal panel 1. The data lines 23 are sequentially connected to an output stage of a source driver 22 serving as a driving unit that drives the liquid crystal panel 1.

The TFTs 21 are on/off controlled by inputting a scan signal to be supplied in line order from the gate driver 24, to the scan lines 25 serving as wiring lines. During an on period, a TFT 21 applies to its corresponding pixel electrode 5 a data voltage to be inputted from the source driver 22 to each data line 23 serving as a wiring line. During an off period, the TFT 21 holds a data voltage obtained so far. Then, by data voltages applied through the TFTs 21, the light transmittance of a liquid crystal which is determined by the electrooptic characteristics of the liquid crystal is controlled and an image is displayed.

At corners of the glass substrate 6 are provided transfer electrodes 29, each of which is connected to an end of a voltage line 30. Each voltage line 30 extends through the source driver 22 or the gate driver 24 and the other end thereof is connected to a COM terminal outside the source driver 22 or a COM terminal outside the gate driver 24. The transfer electrodes 29 are connected, through a conductive resin, to transfer electrodes provided to the counter electrode 2 so that a voltage Vcom for the counter electrode 2 is applied to the counter electrode 2 from the external COM terminals through the voltage lines 30.

In addition to such a source driver 22 and a gate driver 24 serving as driving units, the liquid crystal display device includes, as shown in FIG. 4, peripheral circuits such as an LCD control circuit 31, an LCD power supply circuit 33, and a backlight power supply circuit 34.

The LCD control circuit 31 generates, using a synchronizing signal SYNC to be inputted thereto, a control signal SD-CS necessary to control the operation of the source driver 22, a control signal GD-CS necessary to control the operation of the gate driver 24, a control signal LP-CS necessary to control the LCD power supply circuit 33, and a control signal BP-CS necessary to control the backlight power supply circuit 34. The LCD control circuit 31 then outputs the generated various control signals to the source driver 22, the gate driver 24, the LCD power supply circuit 33, and the backlight power supply circuit 34, respectively.

At the same time, the LCD control circuit 31 captures display data DATA to be inputted thereto, in synchronization with the synchronizing signal SYNC to be inputted thereto, and outputs to the source driver 22 image data PD to be displayed on the liquid crystal panel 1. Note that the display data DATA to be inputted is a signal obtained by A/D converting a CRT output signal from a PC, a signal reconstructed by a DVI receiver IC or a DVI signal, a signal reconstructed by an LVDS receiver IC or an LVDS signal, a signal generated by a dedicated PCI card, an LCD signal to be outputted from a CPU or an LCD controller IC mounted on a PDA, mobile phone, or the like, a signal obtained by the LCD control circuit 31 directly controlling a video RAM in an apparatus such as a PDA or PC, or the like.

The LCD power supply circuit 33 generates, in synchronization with the control signal LP-CS generated by the LCD control circuit 31, a drive voltage for the source driver 22, a drive voltage for the gate driver 24, and a voltage Vcom for the counter electrode 2 of the liquid crystal panel 1 and outputs the voltages. The backlight power supply circuit 34 generates a voltage for lighting up the backlight 26, in synchronization with the control signal BP-CS generated by the LCD control circuit 31 and performs on/off control of the backlight 26.

The source driver 22 captures the image data PD outputted from the LCD control circuit 31, in synchronization with the control signal SD-CS generated by the LCD control circuit 31 and applies a voltage corresponding to the image data PD to the data lines 23. The gate driver 24 applies an on/off control voltage in line order to the scan lines 25, in synchronization with the control signal GD-CS generated by the LCD control circuit 31.

Figure 5:
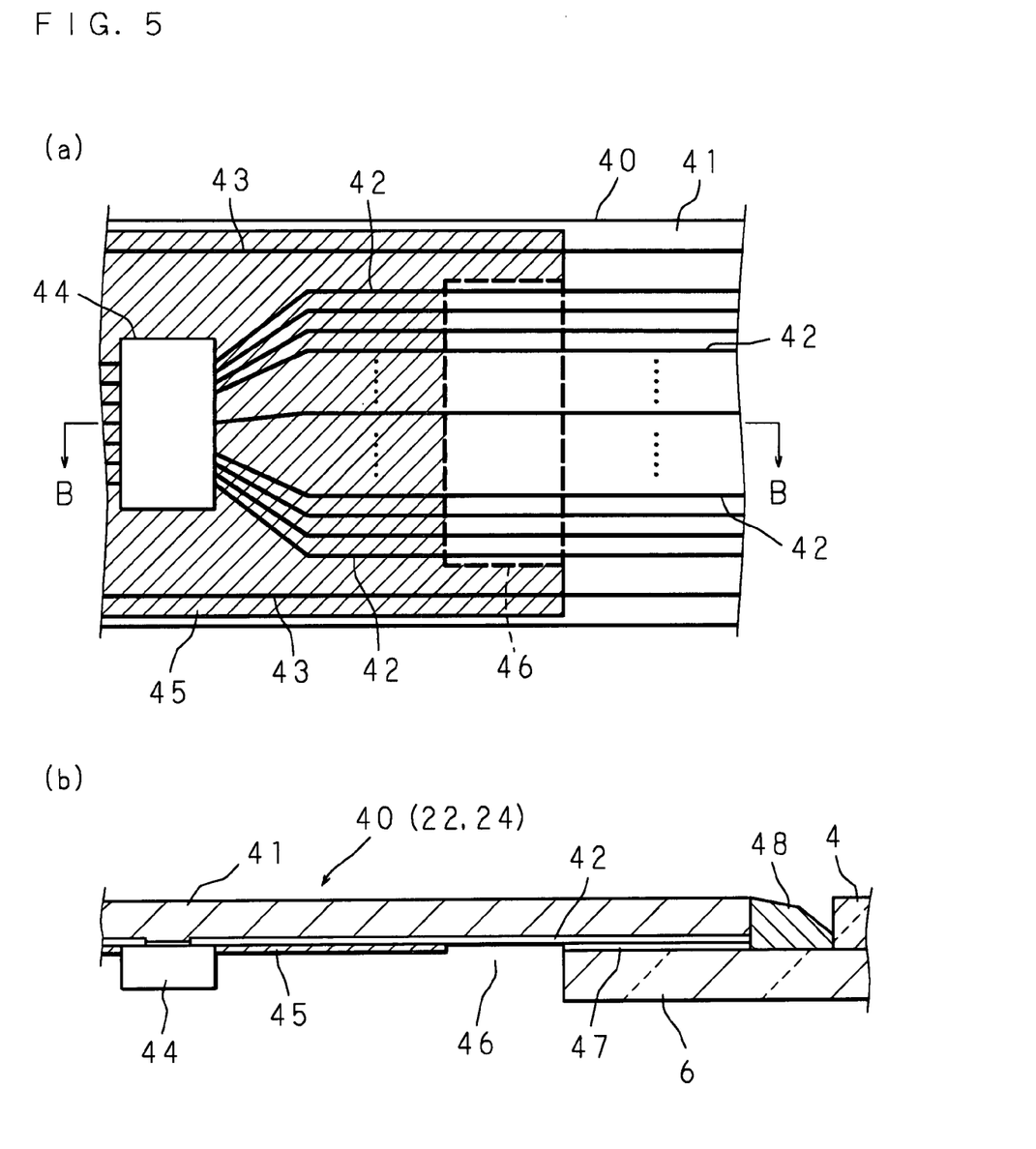
FIG. 5 is a diagram showing an external voltage supply region according to a first embodiment.

Now, an alignment process of the first embodiment which is a characteristic part of the present invention will be described. FIG. 5 is a diagram showing an external voltage supply region according to the first embodiment. FIG. 5(a) is an underside view of a driving unit 40 (the source driver 22 or the gate driver 24) and FIG. 5(b) is a cross-sectional view taken along line B-B in FIG. 5(a). Note that in FIG. 5(b) the glass substrates 4 and 6 are also shown.

In the driving unit 40, electrodes 42 which form part of the data lines 23 or the scan lines 25 and electrodes 43 which form part of the voltage lines 30 are patterned on a polyimide base film 41 in such a manner that the electrodes 42 and 43 extend in a longitudinal direction. A driver IC 44 connected to the electrodes 42 is provided on the base film 41. Although surfaces of portions of the electrodes 42 and 43 in proximity to the driver IC 44 are covered with an insulating film 45, part of the electrodes 42 is an insulating film absent region (a region surrounded by a dashed line in FIG. 5(a)) which is not covered with the insulating film 45. The insulating film absent region functions as an external voltage supply region 46 that receives, from the outside, application of a voltage which is different from an output voltage from the driving unit 40 (the source driver 22 or the gate driver 24). Note that in a conventional example the region surrounded by the dashed line is also covered with an insulating film.

Portions of the electrodes 42 and 43 located above the glass substrate 6 are not covered with the insulating film 45. By thermocompression bonding these electrodes 42 and 43 to electrodes 47 on the glass substrate 6, data lines 23 or scan lines 25 and voltage lines 30 are composed and the driving unit 40 (the source driver 22 or the gate driver 24) is mounted on the liquid crystal panel 1. Note that a vapor material 48 made of a silicon rubber, for example, is applied to an end of the driving unit 40 on the glass substrate 6. Such a vapor material may be applied to the driver IC 44.

In such a configuration, when the alignment of the initial state of a ferroelectric liquid crystal is disarranged upon, for example, mounting the driving unit 40 (the source driver 22 or the gate driver 24), the alignment is restored to the initial state with the driving unit 40 being mounted, by an alignment process such as the one described below.

All data lines 23 (all electrodes 42) of the source driver 22 are short-circuited and all scan lines 25 (all electrodes 42) of the gate driver 24 are short-circuited and then voltages at which the alignment of the initial state can be obtained are applied from the outside through the external voltage supply region 46 and through the voltage lines 30 (the electrodes 43) from the COM terminals. For example, the entire source side is connected to 0 volt (GND) and the entire gate side is connected to 0 volt (GND) and then a voltage Vcom for the counter electrode 2 is applied. The voltage Vcom changes depending on the characteristics of the component members of the liquid crystal panel 1, such as the filled ferroelectric liquid crystal and the formed alignment films 7 and 8, and also changes depending on the environment (temperature, etc.) of voltage application.

By an alignment process such as the one described above, by short-circuiting all electrodes 42 on the side of the source driver 22 the potentials of all data lines 23 become the same, and by short-circuiting all electrodes 42 on the side of the gate driver 24 the potentials of all scan lines 25 become the same. Accordingly, there are no variations in voltage to be applied to the respective pixel electrodes 5, making it possible to easily obtain excellent alignment of the initial state.

Note that it is preferable in terms of a short circuit or oxidation of the electrodes 42 that, after an alignment process such as the one described above is finished, an insulating film be formed on or a vapor material be applied to the insulating film absent region which functions as the external voltage supply region 46.

It is also possible that the external voltage supply region 46 (insulating film absent region) may be covered with a removable insulating label and when an alignment process is performed the insulating label may be peeled off to apply a voltage, and when an alignment process is not performed the insulating label may be covered.

Second Embodiment

Since the configurations of the liquid crystal panel 1, the backlight 26, and their peripheral circuits according to a second embodiment are the same as those according to the first embodiment, the description thereof is omitted.

Figure 6:
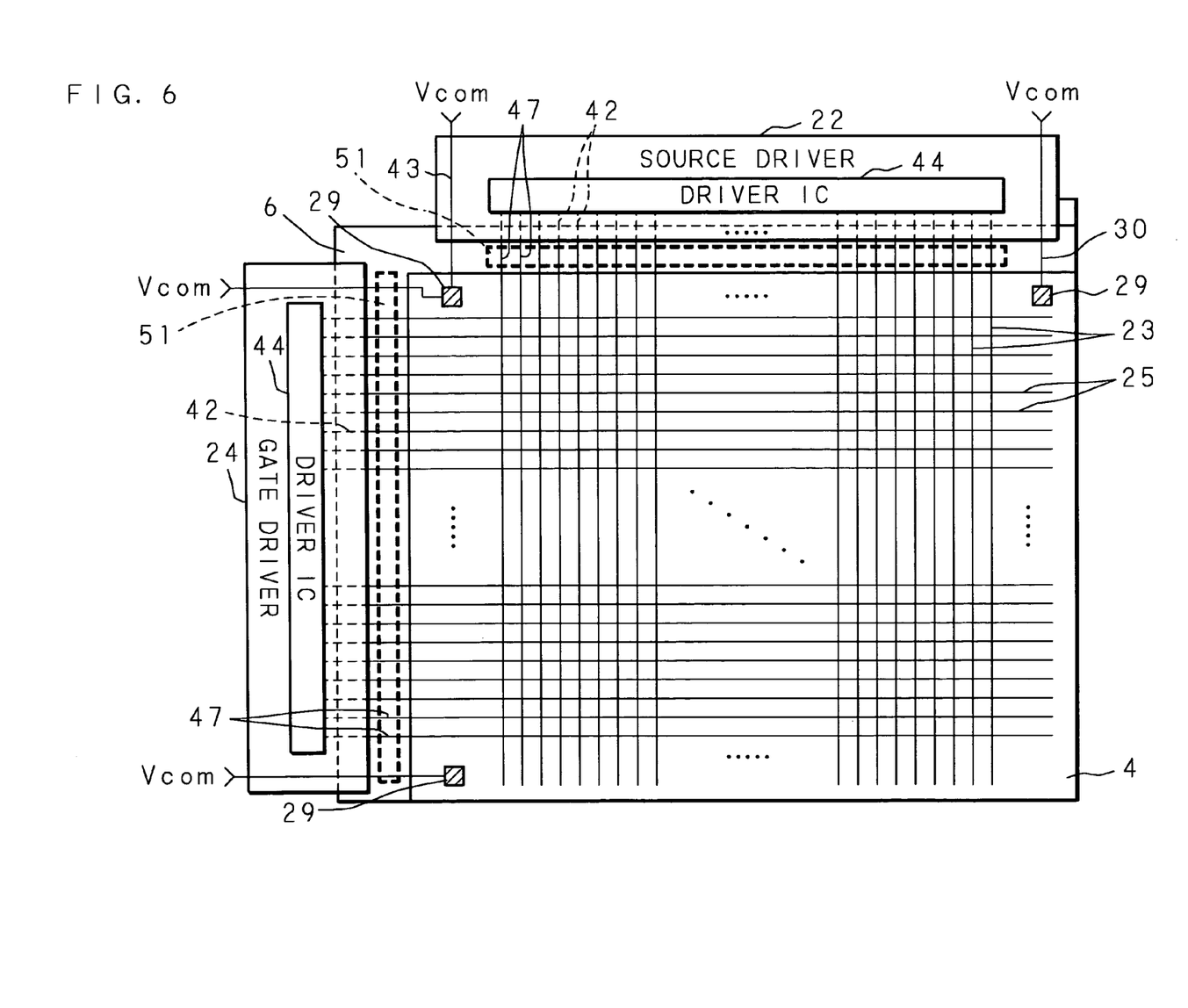
FIG. 6 is a diagram showing external voltage supply regions according to a second embodiment.

An alignment process of the second embodiment will be described. FIG. 6 is a diagram showing external voltage supply regions according to the second embodiment. In FIG. 6, the same parts as those in FIGS. 1 to 5 are denoted by the same reference numerals.

A region (a region surrounded by a dashed line in FIG. 6) where are put together all electrodes 47 which form part of the data lines 23 or the scan lines 25 connecting the driver IC 44 of the source driver 22 or the gate driver 24 which serves as a driving unit 40 to TFTs provided on the glass substrate 6, and which are on the side where the source driver 22 or the gate driver 24 is mounted, functions as an external voltage supply region 51 that receives, from the outside, application of a voltage which is different from an output voltage from the driving unit 40 (the source driver 22 or the gate driver 24).

In such a configuration, when the alignment of the initial state of a ferroelectric liquid crystal is disarranged upon, for example, mounting the driving unit 40 (the source driver 22 or the gate driver 24), the alignment is restored to the initial state with the driving unit 40 being mounted, by an alignment process such as the one described below.

All data lines 23 (all electrodes 47) of the source driver 22 are short-circuited and all scan lines 25 (all electrodes 47) of the gate driver 24 are short-circuited and then voltages at which the alignment of the initial state can be obtained are applied from the outside through the external voltage supply regions 51 and through the voltage lines 30 from the COM terminals. For example, the entire source side is connected to 0 volt (GND) and the entire gate side is connected to 0 volt (GND) and then a voltage Vcom for the counter electrode 2 is applied. The voltage Vcom changes depending on the characteristics of the component members of the liquid crystal panel 1, such as the filled ferroelectric liquid crystal and the formed alignment films 7 and 8, and also changes depending on the environment (temperature, etc.) of voltage application.

By an alignment process such as the one described above, by short-circuiting all electrodes 47 on the side of the source driver 22 the potentials of all data lines 23 become the same, and by short-circuiting all electrodes 47 on the side of the gate driver 24 the potentials of all scan lines 25 become the same. Accordingly, there are no variations in voltage to be applied to the respective pixel electrodes 5, making it possible to easily obtain excellent alignment of the initial state.

Third Embodiment

Since the configurations of the liquid crystal panel 1, the backlight 26, and their peripheral circuits according to a third embodiment are the same as those according to the first embodiment, the description thereof is omitted.

Figure 7:
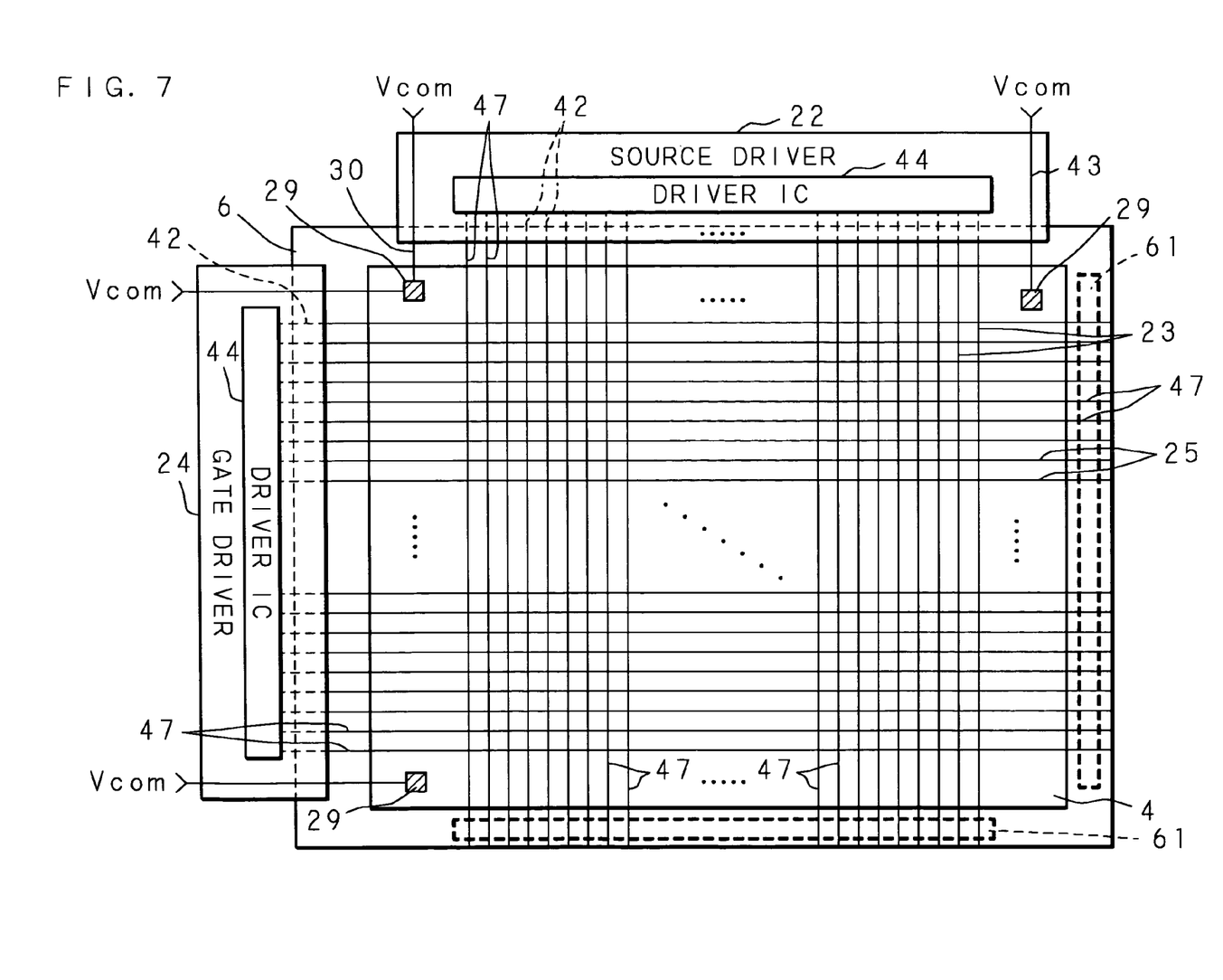
FIG. 7 is a diagram showing external voltage supply regions according to a third embodiment.

An alignment process of the third embodiment will be described. FIG. 7 is a diagram showing external voltage supply regions according to the third embodiment. In FIG. 7, the same parts as those in FIGS. 1 to 5 are denoted by the same reference numerals.

A region (a region surrounded by a dashed line in FIG. 7) where are put together all electrodes 47 which form part of the data lines 23 or the scan lines 25 connecting the driver IC 44 of the source driver 22 or the gate driver 24 which serves as a driving unit 40 to TFTs provided on the glass substrate 6, and which are on the other side of the side where the source driver 22 or the gate driver 24 is mounted, functions as an external voltage supply region 61 that receives, from the outside, application of a voltage which is different from an output voltage from the driving unit 40 (the source driver 22 or the gate driver 24).

In such a configuration, when the alignment of the initial state of a ferroelectric liquid crystal is disarranged upon, for example, mounting the driving unit 40 (the source driver 22 or the gate driver 24), the alignment is restored to the initial state with the driving unit 40 being mounted, by an alignment process such as the one described below.

All data lines 23 (all electrodes 47) of the source driver 22 are short-circuited and all scan lines 25 (all electrodes 47) of the gate driver 24 are short-circuited and then voltages at which the alignment of the initial state can be obtained are applied from the outside through the external voltage supply regions 61 and through the voltage lines 30 from the COM terminals. For example, the entire source side is connected to 0 volt (GND) and the entire gate side is connected to 0 volt (GND) and then a voltage Vcom for the counter electrode 2 is applied. The voltage Vcom changes depending on the characteristics of the component members of the liquid crystal panel 1, such as the filled ferroelectric liquid crystal and the formed alignment films 7 and 8, and also changes depending on the environment (temperature, etc.) of voltage application.

By an alignment process such as the one described above, by short-circuiting all electrodes 47 on the side of the source driver 22 the potentials of all data lines 23 become the same, and by short-circuiting all electrodes 47 on the side of the gate driver 24 the potentials of all scan lines 25 become the same. Accordingly, there are no variations in voltage to be applied to the respective pixel electrodes 5, making it possible to easily obtain excellent alignment of the initial state.

Fourth Embodiment

Figure 8:
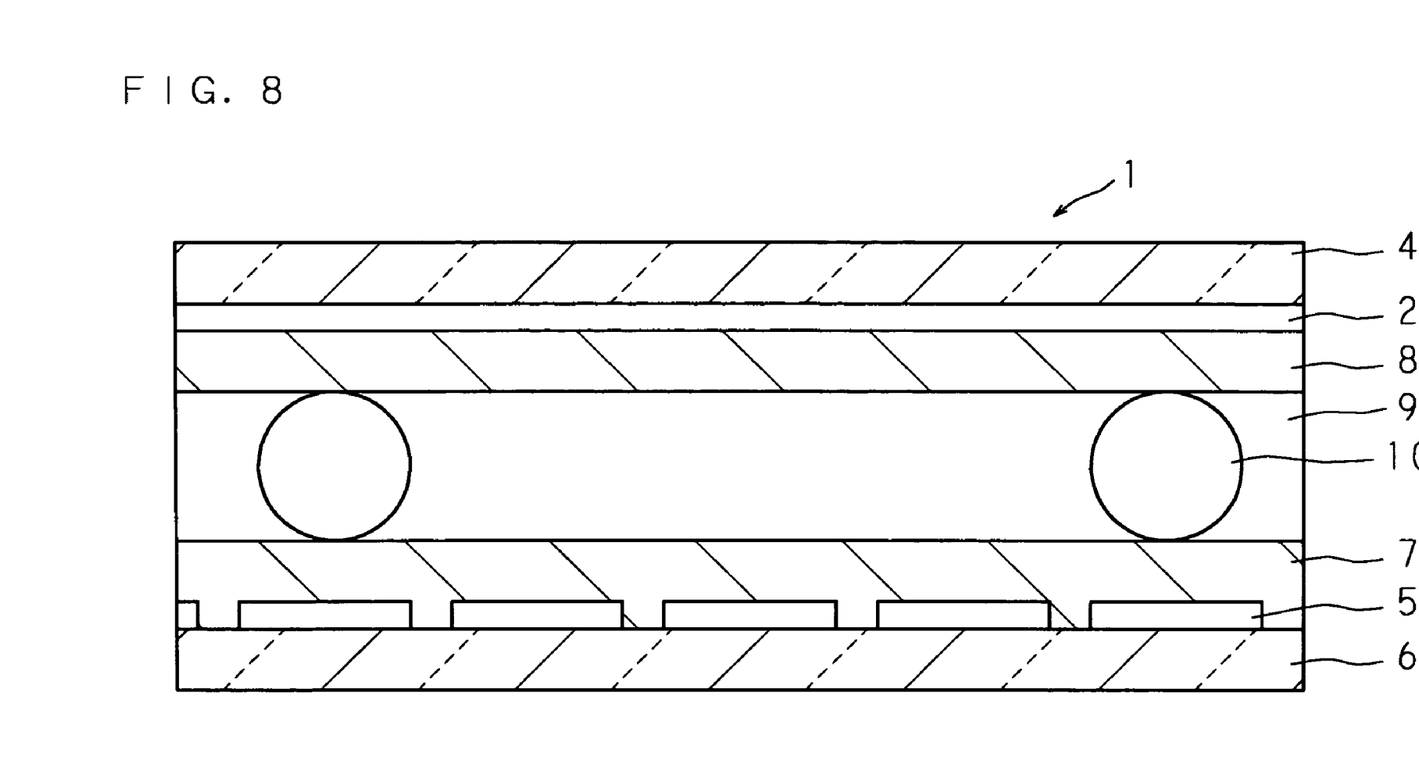
FIG. 8 is a schematic cross-sectional view of a liquid crystal panel.
Figure 9:
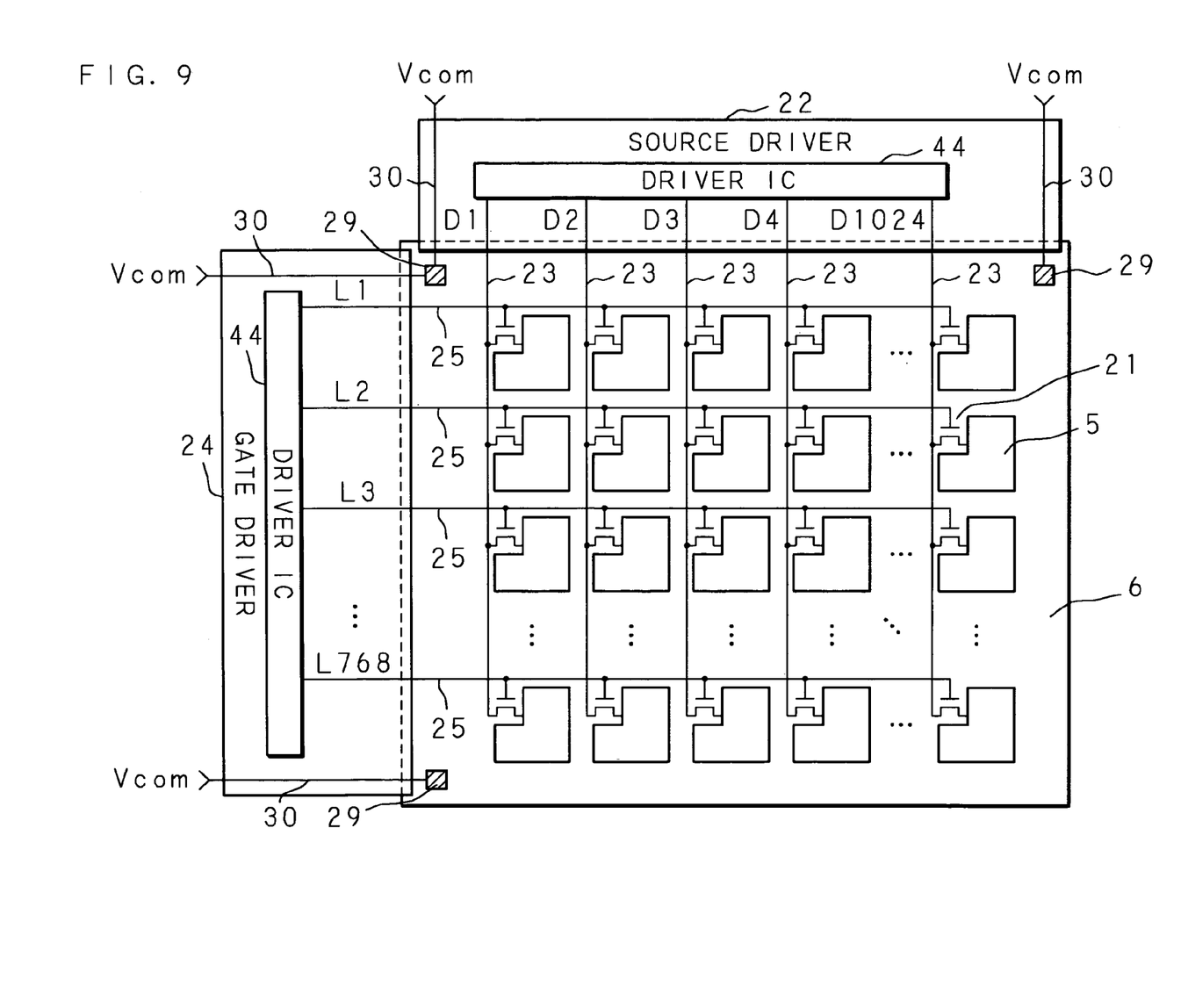
FIG. 9 is a schematic plan view of the liquid crystal panel.
Figure 10:
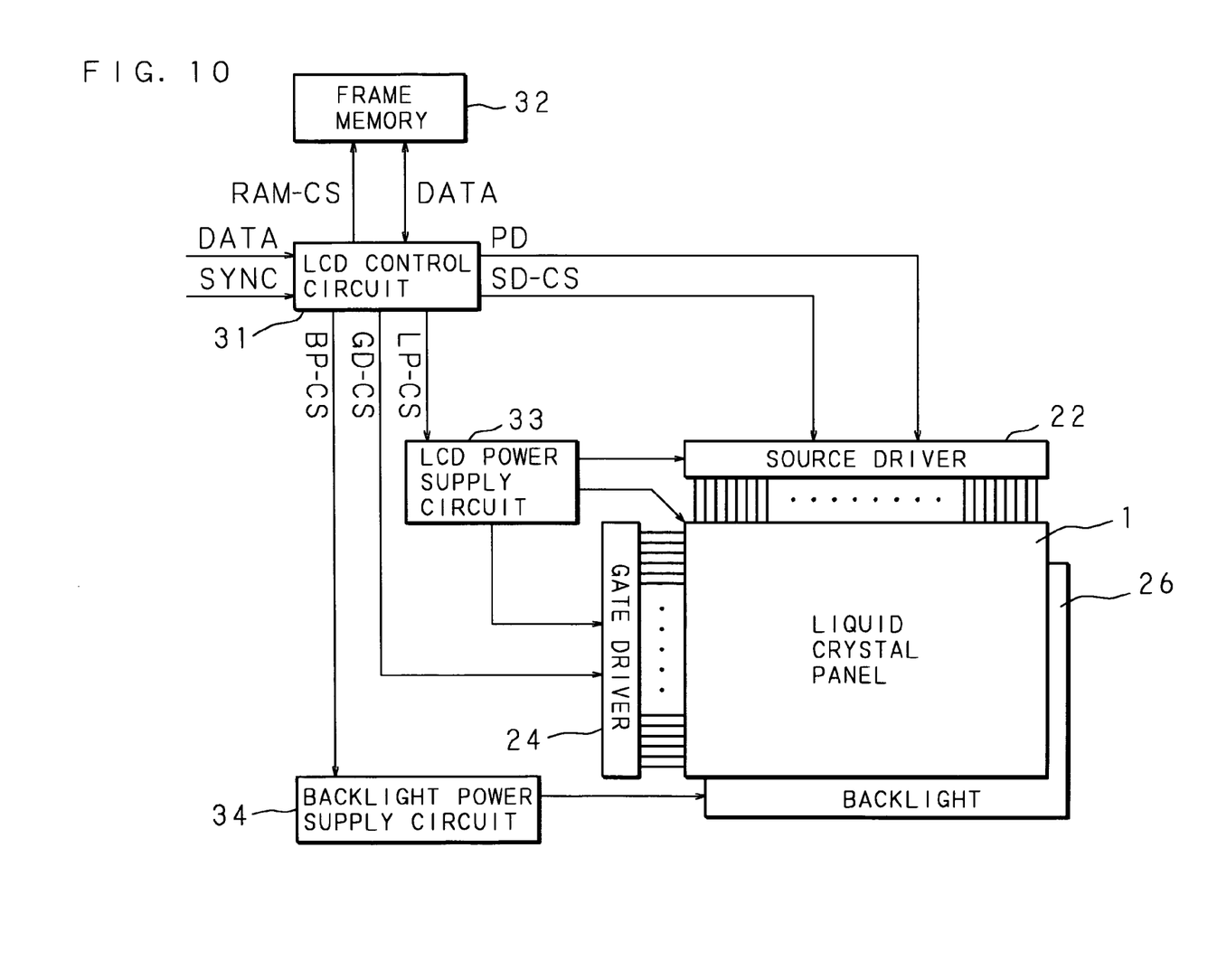
FIG. 10 is a block diagram showing the overall configuration of a liquid crystal display device.

FIG. 8 is a schematic cross-sectional view showing a configuration of a liquid crystal panel 1, FIG. 9 is a schematic plane view of the liquid crystal panel 1, and FIG. 10 is a block diagram showing the overall configuration of a liquid crystal display device. In FIGS. 8 to 10, parts that are the same as or similar to those in FIGS. 1 to 4 are denoted by the same reference numerals. In a fourth embodiment, a liquid crystal display device includes a backlight 26 that emits light of RGB colors and performs color display by a field sequential method without using color filters.

As shown in FIG. 8, the liquid crystal panel 1 includes a glass substrate 6 having pixel electrodes 5 (e.g., 0.24×0.24 mm$^2$, number of pixels: 1024 H×768V, and 12.1-inch diagonal) disposed in a matrix form; and a glass substrate 4 having a counter electrode 2. An alignment film 7 and an alignment film 8 are provided on the pixel electrodes 5 and the counter electrode 2, respectively. The glass substrates 6 and 4 are disposed in such a manner that the alignment films 7 and 8 face each other. A liquid crystal layer 9 is formed by filling a ferroelectric liquid crystal into a space made by scattering, between the alignment films 7 and 8, spacers 10 for maintaining a gap (e.g., 1.6 micrometers) which is uniform in a plane. As in the first embodiment, the liquid crystal panel 1 is sandwiched between two polarizing plates 11 and 12 (see FIG. 2), and furthermore, the backlight 26 having an RGB light source is disposed therebelow.

As shown in FIG. 9, pixel electrodes 5 and TFTs 21 are disposed in a matrix (e.g., 1024 H×768V) on the glass substrate 6 and each pixel electrode 5 is connected to a drain terminal of its corresponding TFT 21. Gate terminals of the TFTs 21 are connected to scan lines 25 (Li:i=1, 2, 3, . . . 768) sequentially connected to an output stage of a gate driver 24. Source terminals of the TFTs 21 are connected to data lines 23 (Dj:j=1, 2, 3, . . . 1024) sequentially connected to an output stage of a source driver 22. The operation of image display by light transmittance control of a liquid crystal using the source driver 22, the gate driver 24, and the TFTs 21 is the same as that in the first embodiment.

In addition to such a source driver 22 and a gate driver 24, the liquid crystal display device includes, as shown in FIG. 10, peripheral circuits such as an LCD control circuit 31, a frame memory 32, an LCD power supply circuit 33, and a backlight power supply circuit 34.

The LCD control circuit 31 generates, using a synchronizing signal SYNC to be inputted thereto, a control signal RAM-CS necessary to control input/output timing of image data in the frame memory 32 and outputs the generated control signal RAM-CS to the frame memory 32. The frame memory 32 accumulates display data DATA captured by the LCD control circuit 31 or outputs the accumulated display data DATA to the LCD control circuit 31, in synchronization with the control signal RAM-CS generated by the LCD control circuit 31. Note that the frame memory 32 may be built in an IC in the LCD control circuit 31.

The LCD control circuit 31 captures, in synchronization with the synchronizing signal SYNC to be inputted thereto, display data DATA to be inputted thereto, accumulates the captured display data DATA in the frame memory 32, reads the accumulated display data DATA from the frame memory 32, and outputs to the source driver 22 image data PD to be displayed on the liquid crystal panel 1. Subsequent operations are the same as those in the first embodiment.

Even in such a liquid crystal display device using a field sequential method, by forming an external voltage supply region such as that described in the first to third embodiments and applying a voltage for an alignment process through the external voltage supply region, the alignment can be easily restored to its initial state with a driving unit 40 (the source driver 22 or the gate driver 24) being mounted on the liquid crystal panel 1.

Although the above embodiments describe the use of an external voltage supply region upon performing an alignment process, the external voltage supply region that enables application, from the outside, of a voltage which is different from an output voltage from the driving unit 40 (the source driver 22 or the gate driver 24) can also be used for other purposes than an alignment process. Since application of an external voltage not through the driving unit 40 is enabled, evaluation can be made such that the characteristics of the liquid crystal panel 1 itself are distinguished from the characteristics of the driving unit 40. For example, when a display failure occurs, it is possible to determine which one of the liquid crystal panel 1 and the driving unit 40 is the cause of the failure.

Note that although the above embodiments describe that a single driver IC 44 is provided to each of the source driver 22 and the gate driver 24, a plurality of drivers IC may be provided and an external voltage supply region may be formed by putting together electrodes drawn from each driver IC.

The voltage lines 30 for application of a voltage to the counter electrode 2 may be separately provided instead of allowing the voltage lines 30 to pass through the source driver 22 or the gate driver 24.

Although the above examples describe the use of a ferroelectric liquid crystal as a liquid crystal material, needless to say, the present invention can also be applied when an antiferroelectric liquid crystal having spontaneous polarization is used.

Liquid crystal display devices of the present invention, such as those described above, can be applied not only to desktop liquid crystal displays, liquid crystal displays mounted on notebook PCs, liquid crystal displays mounted on PDAs or mobile phones, liquid crystal displays mounted on game machines, and liquid crystal displays for home or portable televisions, but also to display devices such as video cameras or digital cameras which directly view viewfinders or monitors, car navigation devices, and POS terminals.

The invention claimed is:

1. A liquid crystal display device, comprising:
    a liquid crystal panel having a liquid crystal material filled between substrates which face each other;
    a driving unit that drives the liquid crystal panel to control application of a voltage to the liquid crystal material, for each of a plurality of pixels;
    wiring lines connecting the liquid crystal panel and the driving unit; and
    a region for applying to the wiring lines, from outside, a voltage other than an output voltage from the driving unit,
    wherein, when an alignment process is performed, the wiring lines are short-circuited at the region such that each of the wiring lines has a same voltage potential.

2. The liquid crystal display device according to claim 1, wherein the liquid crystal material is a liquid crystal material having spontaneous polarization.

3. The liquid crystal display device according to claim 1, wherein color display is performed by a color filter method.

4. The liquid crystal display device according to claim 1, wherein color display is performed by a field sequential method.

5. A liquid crystal display device, comprising:
    a liquid crystal panel having a liquid crystal material filled between substrates which face each other;
    a driving unit that is mounted on the liquid crystal panel and drives the liquid crystal panel to control application of a voltage to the liquid crystal material, for each of a plurality of pixels;
    wiring lines connecting the liquid crystal panel and the driving unit;
    a region for applying to the liquid crystal panel, from outside, a voltage other than an output voltage from the driving unit,
    wherein, when an alignment process is performed, the wiring lines are short-circuited at the region such that each of the wiring lines has a same voltage potential.

6. The liquid crystal display device according to claim 5, wherein the driving unit is mounted on one side of the liquid crystal panel having a rectangular shape, and the region is provided on the side of the liquid crystal panel where the driving unit is mounted.

7. The liquid crystal display device according to claim 5, wherein the driving unit is mounted on one side of the liquid crystal panel having a rectangular shape, and the region is provided on other side of the side of the liquid crystal panel where the driving unit is mounted.

8. The liquid crystal display device according to claim 5, wherein the liquid crystal material is a liquid crystal material having spontaneous polarization.

9. The liquid crystal display device according to claim 5, wherein color display is performed by a color filter method.

10. The liquid crystal display device according to claim 5, wherein color display is performed by a field sequential method.

11. An alignment process method of performing, on a liquid crystal display device including: a liquid crystal panel having a liquid crystal material filled between substrates which face each other; a driving unit that drives the liquid crystal panel to control application of a voltage to the liquid crystal material, for each of a plurality of pixels; and wiring lines connecting the liquid crystal panel and the driving unit, an alignment process for the liquid crystal material by applying a voltage to the liquid crystal panel, the method comprising:
    performing an alignment process by applying a voltage to a region which is provided to the wiring lines and to which a voltage other than an output voltage from the driving unit is applied from outside; and
    when performing the alignment process, short-circuiting the wiring lines at the region such that each of the wiring lines has a same voltage potential.

12. An alignment process method of performing, on a liquid crystal display device including: a liquid crystal panel having a liquid crystal material filled between substrates which face each other; a driving unit that is mounted on the liquid crystal panel and drives the liquid crystal panel to control application of a voltage to the liquid crystal material, for each of a plurality of pixels; and wiring lines connecting the liquid crystal panel and the driving unit, an alignment process for the liquid crystal material by applying a voltage to the liquid crystal panel, the method comprising:
    performing an alignment process by applying a voltage to a region which is provided to the liquid crystal panel and to which a voltage other than an output voltage from the driving unit is applied from outside; and
    when performing the alignment process, short-circuiting the wiring lines at the region such that each of the wiring lines has a same voltage potential.

* * * * *